April 26, 1955  A. E. ROY ET AL  2,706,919
MACHINE FOR MAKING SAW BLADES
Filed Jan. 30, 1950  4 Sheets-Sheet 3
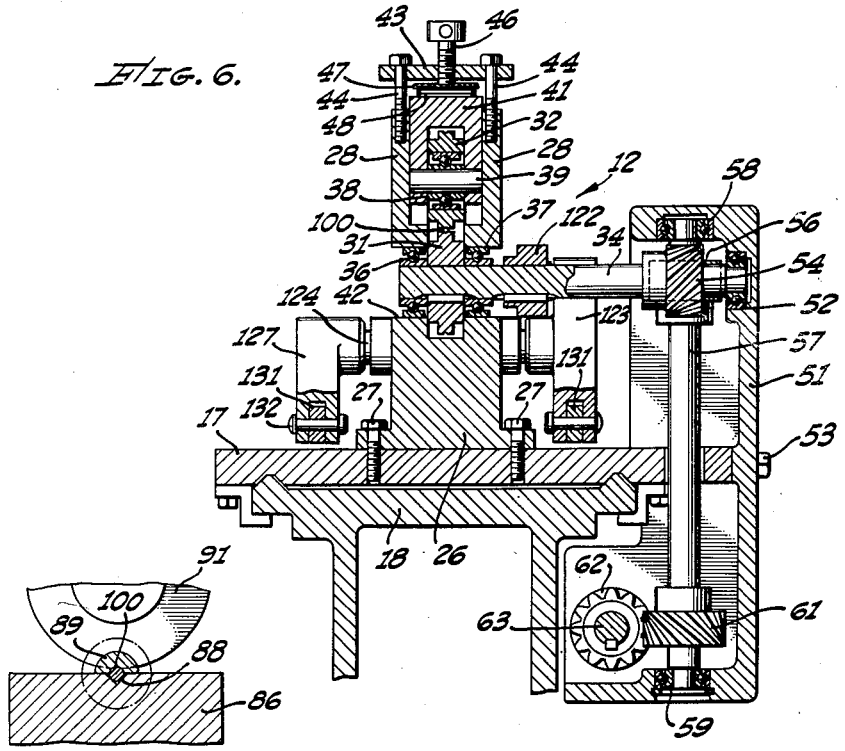
FIG. 6.
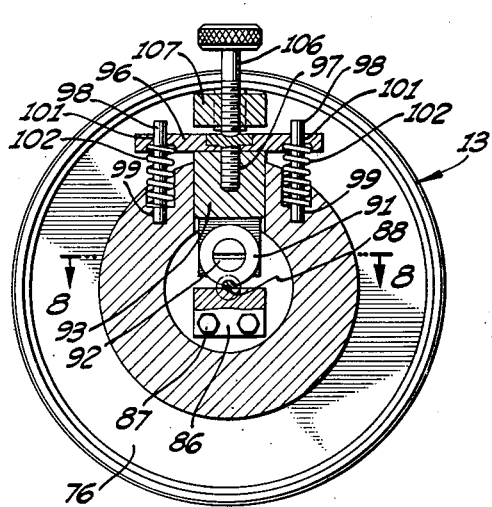
FIG. 7.
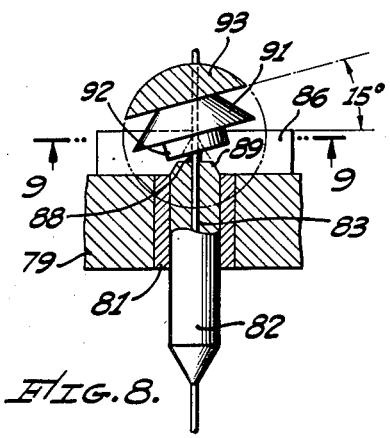
FIG. 8.
FIG. 9.
ALBERT E. ROY,
TRUMAN V. TYLER,
INVENTORS
ATTORNEY.

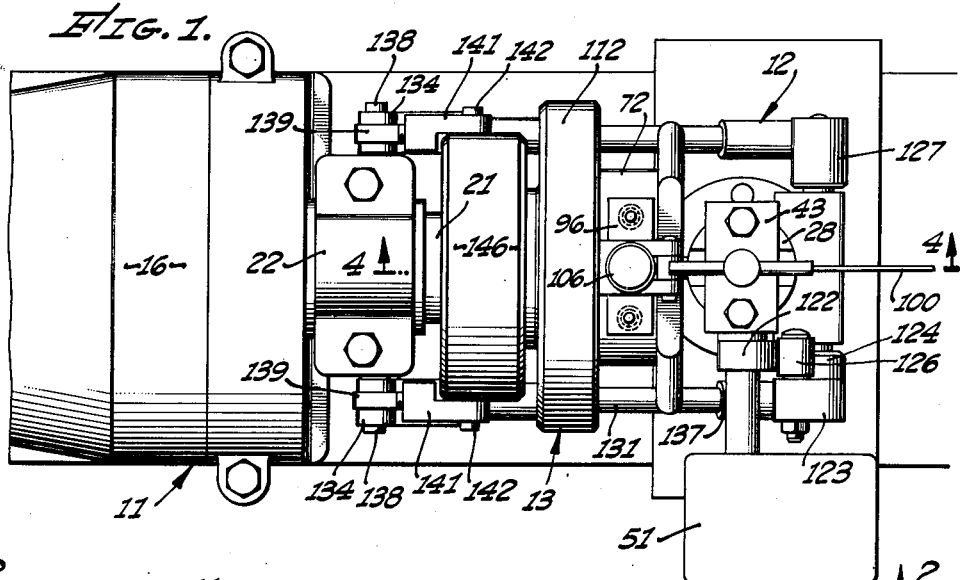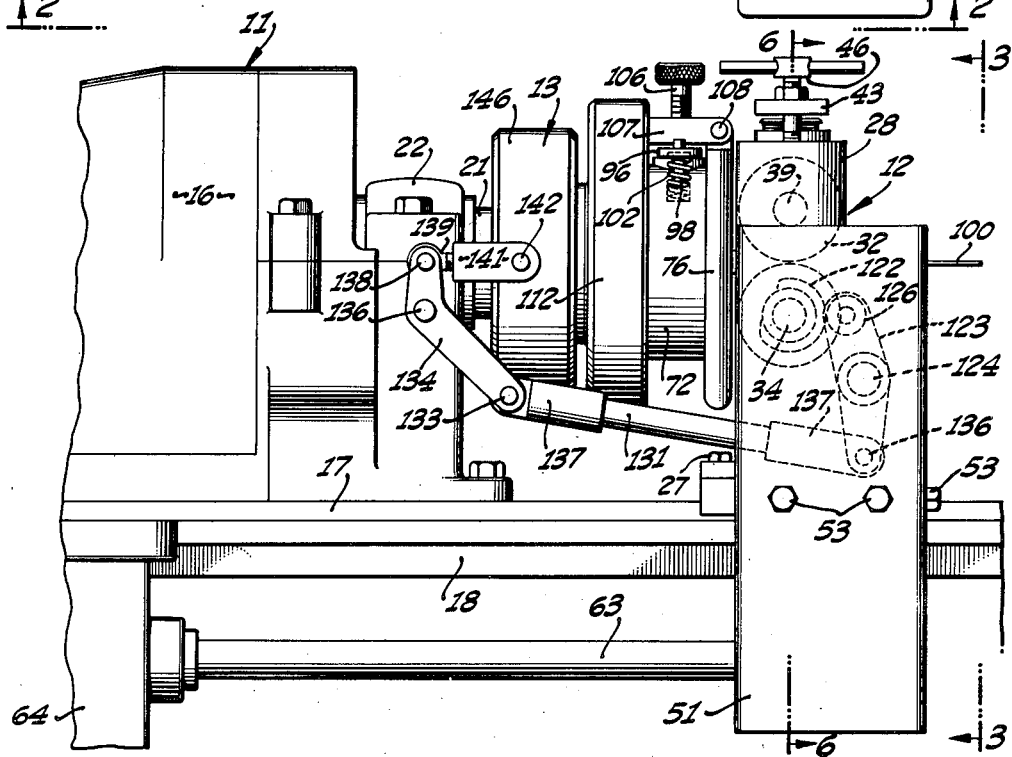

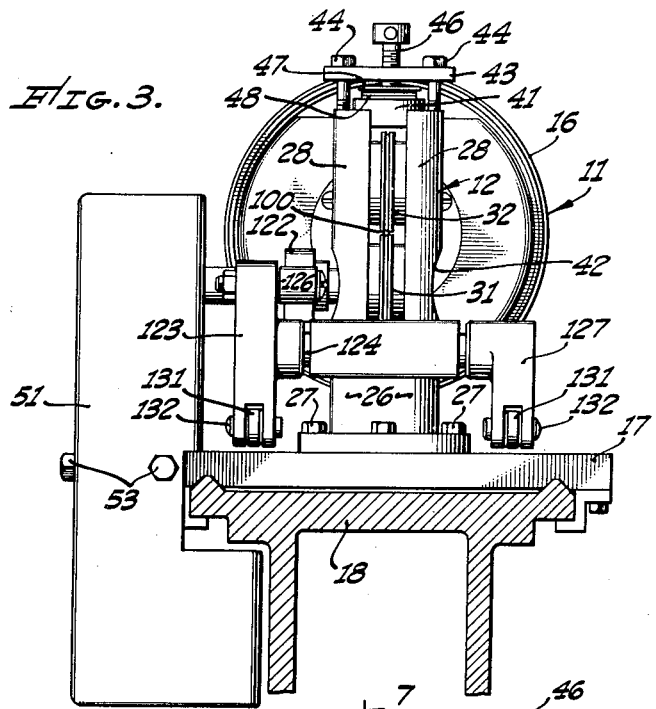
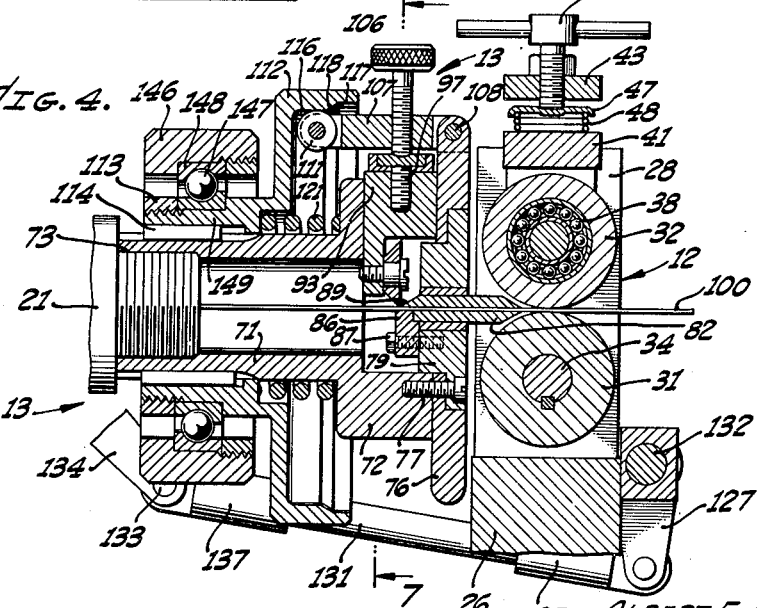
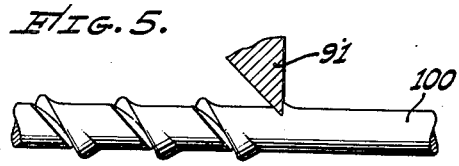

April 26, 1955  A. E. ROY ET AL  2,706,919
MACHINE FOR MAKING SAW BLADES
Filed Jan. 30, 1950  4 Sheets-Sheet 4

INVENTORS.

United States Patent Office 2,706,919
Patented Apr. 26, 1955

2,706,919

MACHINE FOR MAKING SAW BLADES

Albert E. Roy, Burbank, and Truman V. Tyler, Palos Verdes Estates, Calif.

Application January 30, 1950, Serial No. 141,178

3 Claims. (Cl. 80—10)

This application is a continuation in part of application Serial No. 693,888 filed August 30, 1946, for Machine for Making Saw Blades, now abandoned.

The present invention relates to a machine and method for making saw blades and particularly for making saw blades from a continuous wire. More specifically, the invention comprises a machine for cutting spiral teeth of a predetermined length in hardened wire to form a saw blade capable of cutting in any direction. The saw blade made by this machine is covered by United States Patent No. 2,514,609, to which reference is made. That patent discloses and claims a spiral saw blade having a vertical cutting face and a sloping clearance face.

Saw blades manufactured in accordance with the present invention may be of different sizes, both in the diameter and in the length of the blade. They are particularly suitable, however, for use as scroll or coping saws the direction of advance of which is frequently changed during a single cutting operation. The blades of such saws in the past have usually been rectangular in section with teeth formed along one edge and though relatively small, it was impossible in use to redirect the cut at right angles to itself without first rounding a corner. Under no circumstances could such blades round an angle less than a right angle and these limitations have been well known and accepted. Additionally, such blades, being relatively thin, differ in the strength resistng breakage under forces from different directions and as a result are sometimes easily broken by a force which could have been withstood readily had it been applied from another direction.

With a recognition of these difficulties and shortcomings characteristic of the blades of the prior art, it is the purpose of the present invention to provide a method and a machine to make saw blades which are capable of cutting in all directions; blades which can cut at right or at acute angles to their former direction of travel while embedded in the material being sawed. This machine is adapted to make blades from a traveling endless hardened wire and to determine automatically the length of each blade. It is adjustable and so can handle wires of various diameters and operates substantially without attention after being placed in operation.

It is an object of the present invention to provide a new and improved saw-making machine.

It is a further object of the invention to provide a machine for making saw blades having spiral teeth.

It is still another object of the invention to provde a saw-making machine capable of making saw blades from a continuous moving hardened wire.

A still further object of the invention is to provide a saw-making machine in which a continuous wire is fed past a tooth-forming tool automatically positioned to form teeth at spaced intervals and for predetermined lengths thereon.

The present invention provides a machine for making saw blades, including means to advance a continuous metal element, and cutter means for engaging said element to cut and roll a spiral groove and an adjacent spiral saw tooth therefrom.

The present invention also provides a machine for making saw blades, having means to advance a continuous wire, a rotating anvil and cutter between which the wire passes, means to rotate the anvil and cutter about the wire, spring means exerting a force urging the cutter against the wire in all angular positions, and means to effect the release of the force.

The present invention further provides a machine for making saw blades, including means to advance a continuous wire, a guide bushing to receive the wire from the means and direct it onto an anvil, a cutter adjacent the anvil in position to cut into the wire moving thereover, and means to rotate the guide bushing, anvil and cutter around the wire.

The present invention also further provides a method of making a saw blade comprising the step of forming a continuous metal wire against a rotating cutter to form on such wire, and from its material, a raised, sharp spiral saw tooth.

The features of the invention will appear upon reading the following specification and claims and upon considering in connection therewith the drawings to which they relate.

Referring now to the accompanying drawings in which a preferred embodiment of the invention is illustrated:

Figure 1 is a partial top plan view of a machine constructed in accordance with the present invention;

Figure 2 is a side view of the construction looking in the direction of the arrows upon the line 2—2 of Figure 1;

Figure 3 is an end view looking in the direction of the arrows upon the line 3—3 of Figure 2;

Figure 4 is a partial vertical section upon the line 4—4 of Figure 1;

Figure 5 is an enlarged view of the wire being acted upon by the tooth-forming tool;

Figure 6 is a vertical section through the feeding mechanism upon the line 6—6 of Figure 2;

Figure 7 is a vertical section through a cutting head upon the line 7—7 of Figure 4;

Figure 8 is a broken section upon the line 8—8 of Figure 7;

Figure 9 is a section upon the line 9—9 of Figure 8 showing the blade forming tool.

Figure 10:
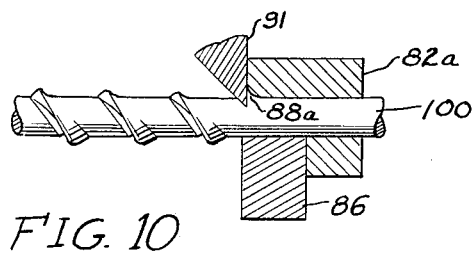
Figures 10 and 11 show a further embodiment of the invention.

Referring to the drawings, a preferred embodiment of the present invention is illustrated and is seen to comprise three principal parts, which are a lathe, indicated generally by the reference character 11; a wire feeding mechanism, indicated generally by the reference character 12; and a blade-cutting head, indicated generally by the reference character 13.

Referring now particularly to the lathe 11, which may be of the common and well known type, it is seen to comprise a headstock 16 carried by a platform 17 which is itself supported upon the lathe bed 18. A spindle 21 extends from the forward end of the headstock 16 being rotatably mounted in a bearing 22. The driving means for the spindle 21 is preferably an unshown electrical motor suitably connected thereto in a manner which of itself forms no part of the present invention. The cutting head 13 is carried by spindle 21 and rotates therewith as will hereinafter be fully described.

The wire feed mechanism 12 is positioned forwardly of the cutting head 13 and headstock 16 and includes a vertically extending supporting frame or post 26 secured at its lower end to supporting platform 17 by bolts 27. The upper end of post 26 is bifurcated and centrally bored to form spaced vertically extending semi-circular supporting walls 28. A pair of wire feeding rollers 31 and 32 are carried by support 26 in such position that their grooved peripheries make rolling contact in a horizontal plane bisecting the spindle 21. Lower roller 31 is keyed to a horizontal shaft 34 supported by bearings 36 and 37 located in a transverse bore 42 in support 26. Upper roller 32 is positioned between the walls 26 and is rotatably mounted upon a single bearing 38, the inner race of which seats on a shaft 39 supported by the downwardly extending arms of a U-shaped yoke 41 vertically slidable in post 26. While lower roller 31 is fixed in position, upper roller 32 is, it is seen, vertically adjustable. For this purpose a horizontal plate 43 is positioned relative to the top of frame 26 by a pair of vertical bolts passing downwardly therethrough into walls 28. A manually rotatable adjustment screw 46 threads downwardly through the center of plate 43 and into contact with a spring seat 47 enclosing the upper end of a coil spring 48 resting upon the yoke 41. Spring 48 at all times urges the yoke downwardly to force upper roller 32 against lower roller 31. As the compression of spring 48 can be varied by the adjustment of screw 46 and by the upward force exerted by the roller 32, different sizes of wire and variations in a single wire rolling between the groove surface of the rollers 31 and 32 can be accommodated.

Rollers 31 and 32 are intended and designed to advance the wire through the machine and for this reason lower roller 31 is positively driven. To effect this result shaft 34 is extended laterally into a vertically arranged casing or gear box 51 where its outer end is supported by a bearing 52. The casing 51 is itself secured, by means of bolts 53, to the side of platform 17 and is fixed relative to the feeding mechanism 12. To drive shaft 34 means are provided connecting it to the lathe driving motor. These means include a spiral gear 54 near the outer end of shaft 34 which meshes with a gear 56 carried at the upper end of a vertical shaft 57. The latter is rotatably mounted in bearings 58 and 59 in the top and bottom walls respectively, of casing 51 and at its lower end carries a spiral gear 61 meshing with a gear 62. Gear 62 is keyed to drive shaft 63 extending rearwardly from gear box 51 into the transmission casing 64 below headstock 16 and is driven at constant speed during machine operation with a wire positioned between the rollers, as illustrated in Figure 4. Lower roller 31 is rotated counterclockwise and the wire is advanced toward the cutting head 13.

Turning now to the cutting head 13, it is seen to comprise a plurality of parts carried by a hollow cylindrical sleeve 71 enlarged at its outer end at 72 and threaded interiorly at its other end to set upon the reduced end of spindle 21 at 73. At the forward end of sleeve head 72 a plate 76 is secured as by a bolt 77 and is itself centrally apertured to provide a seat for a central supporting plate 79 secured in place by the same screw 77. Plate 79 is itself centrally bored and seats a sleeve 81 carrying a longitudinally extending guide element or bushing 82, the forward pointed conical end of which extends substantially between the rollers 31 and 32 in order immediately to receive the wire therefrom. Element 82 is an extremely hard wear-resisting metal, such as tungsten carbide, and is formed with a longitudinally extending bore 83 of a size closely to enclose the wire. The wire emerges from the guide 82 upon the opposite face of plate 79 in sliding contact with a supporting anvil element 86, also made of the extremely hard wear-resisting metal and secured to the abutting face of plate 79 by screws 87. The upper surface of anvil 86 is slightly notched or grooved at 88, clearly shown in Figure 9, to provide a centering seat for the wire as it emerges from element 82. To insure an absolutely accurate alignment of the wire upon this seat the bushing 82 is formed with an overhanging shoulder 89 which overlies the channel 88 substantially to the edge of the anvil.

It is upon the top surface of anvil 86, and approximately .01" inwardly from the end of channel 88 therein, that the spiral threads or teeth are formed or cut in the wire. The teeth are in reality formed in the wire by a cutting roller 91 rotatably carried by a headed pin 92. The latter is seated on the side of plunger 93 mounted for vertical translation in sleeve head 72 and is attached at its upper end by means of a screw 97 to a plate 96. A pair of guide pins 98 are fixed to a sleeve head 72 in counter-bored recess 99, their upper ends extending through openings 101 in the plate 96 and a coil spring 102 encircles each pin 98 to exert a force radially outwardly so as to move cutter roller 91 from the anvil 86. To vary the lead of the teeth the plunger 93, and so roller 91, are adapted to be angularly adjusted relative to plate 96 with the parts disassembled, by first loosening screw 97, adjusting the parts to the proper angularity, and then again tightening screw 97. In a preferred arrangement, the plane of the roller 91 makes an angle of about 15° with the normal to the wire and contacting the wire at a distance of about .01" inside of the outer face of anvil 86. This angle can be changed in the manner indicated but the angle of 15° has been found to be very desirable.

To urge the cutting roller 91 into thread-forming engagement with the wire as shown in Figure 5, a vertical pressure is exerted upon the plunger 93 and specifically upon the headed end of plate securing screw 97 which is slightly recessed. This pressure is exerted by a manually adjustable screw 106 having a knurled head and seated in an arm 107 pivoted at its forward end at 108 to the plate 76. With the arm 107 held rigidly, the cutting pressure of the cutter 91 and the depth of its cut may be controlled by manually adjusting screw 106. The continuous wire which is to be made into saw blades is indicated in the drawings by the reference character 100 and is fed at a constant rate of speed past the cutter 91 which rolls a spiral groove therein forcing outwardly a raised, spiral, angular sectioned, sharp tooth adjacent thereto. The metal is not cut from the wire and none is lost; instead the metal is displaced in the manner shown in Figure 5.

It is desirable that predetermined lengths of teeth be cut at spaced intervals on the wire. The intervening uncut intervals form the extremities of the blades and are adapted to be shaped to form securing seating means. To effect the discontinuous cutting operation of roller 91 means are provided which automatically release the pressure upon the plunger 93 and these means will now be described.

The rear of the pivoted lever arm 107 carrying pressure adjusting screw 106 also carries a roller 111 in contact with the inner surface of a cylindrical head 112. Head 112 is fixed to an inner collar 113 keyed for sliding movement at 114 upon the cylindrical sleeve 71 of the cutting head and rotatable therewith. The inner surface of head 112 is provided with two longitudinally and radially spaced surfaces 116 and 117 connected by a sloping surface 118. With collar 113 and connected head 112 in one axial position, roller 111 contacts surface 116. Axial movement of collar 113 toward the headstock 16 causes roller 111 to roll outwardly along the inclined surface 118 onto surface 117 to permit lever 107 to pivot outwardly, under the actuation of coil springs 102, and release the pressure exerted upon the cutter 91. A relatively strong coil spring 121 encircles sleeve 71 and exerts an axial force against collar 113 to urge it at all times axially toward head stock 16 so as to effect the release of pressure upon lever 107.

To move the rotatable collar 113 axially so as to place pressure upon lever 107 and so upon the rotatable cutter 91, actuating means are provided which are connected to the driving means for the rollers 31 and 32 and which automatically, and upon the movement of predetermined lengths of wire through the rollers, effect the pressure application and release. These means comprise a rotatable cam 122 keyed to shaft 34 of lower roller 31, which actuates, through a roller 126, a rocker arm 123 fixed to a transverse shaft 124 rotatably mounted on support 26 of feeder mechanism 12. Shaft 124 is extended upon both sides of support 26 and at its opposite end carries a second rocker arm 127 which moves synchronously with rocker arm 123 in response to the displacement of roller 126 induced by the cam 122. The lower ends of rocker arms 123 and 127 are bifurcated and pivotally carry, by means of pins 132, the ends of rods 131. The opposite ends of the latter are connected pivotally at 133 in each instance to the lower end of a rocker arm 134 fixed centrally to a shaft 136 extended through the headstock 16. Suitable turnbuckles 137 are preferably provided at the opposite ends of each rod 131 to make possible such adjustments in its effective length as may be necessary or desirable with changes in the actuating cam 122, a change sometimes made to vary tooth extent upon the blades. The upper ends of the rocker arms 134 are bifurcated and piviotally seat, by means of pins 138, eye-bolts 139. The threaded forward ends of the latter are seated in brackets 141 themselves pivoted at 142 upon diametrically opposed sides of an outer collar 146, non-rotatable, and carried by the outer race 148 of a ball bearing 147, the inner race 149 of which is seated by the axially slidable inner collar 113. As the spindle 21 rotates in the machine operation and with it the collar 113, the cutting element 91 and associated parts, the provision for relative rotation between the two collars 113 and 146 is essential.

Cam 122 rotates with lower wire propelling roller 31 and at the same speed, both being mounted on and keyed to the same shaft 34. The cam surface is so contoured as to effect the pivotal movement of the rocker arm 123, and so rocker arm 127 fixedly related thereto through the shaft 124, and to advance and hold the rod 131 rearwardly during a predetermined arc in the rotation of roller 31. This movement of the rods 131 causes rocker arms 134 to be pivoted about their axes 136, their upper end moving forwardly to force the collar 146 toward the cutting head 13. As inner rotary collar 113 is directly connected to outer collar 146 through the bearing 147, this forward movement of the outer collar causes the inner collar to move and with it its enlarged cylindrical head 112. The latter travels from an axial position in which the roller 111 in arm 107 contacts the outer surface 117 to a position in which it contacts the inner surface 116. This movement of the roller causes the lever arm 107 to be forced inwardly together with the plunger 93 and cutting roller 91, carrying the latter into operative cutting position, in which it remains while that length of wire passes determined by the arc of rotation of roller 31.

The rotation of cam 122 through a predetermined arc releases the pressure which forces the follower 126 outwardly and, under the actuation of the coil spring 121, which at all times tends to move the inner rotary collar 113 rearwardly, the parts are returned to their former positions and the cutting roller moves from its operative position. As the cam is continuously rotated as the wire is fed into the machine, it is clearly evident that predetermined lengths of threads will be cut on the wire and at regularly spaced intervals.

In placing the machine in condition for operation, the wire 100 is first threaded between the grooved abutting surfaces of the rollers 31 and 32, and is extended through the guide element or bushing 82 and over the anvil 86, past the rotatable cutter 91 and out through the hollow lathe spindle 21. The characteristics of the spiral teeth to be formed are determined at this time by the operator. If the substantially standard tooth having an angle of advance of about 15° is to be formed, and the machine has previously been functioning to produce such a tooth, no adjustment of the cutter 91 and its carrying plunger 93 with respect to its carrying plate 96 need be made. If it is desired to vary this angle, however, the lever 107 must be removed permitting the plate 96 and the plunger 93 to be lifted outwardly, whereupon the angle of the cutter relative to the plate 96, which determines the angle of advance of the tooth, is set. Thereafter the plate, plunger, and cutter are returned to their operative positions and lever arm 107 replaced in the relationship illustrated in Figures 4 and 7. The length of the blade teeth will be determined by the contour of the cam 122 which rotates synchronously with the lower roller 31. Depending upon the desired length, the raised portion of the cam will be longer or shorter and, when different length blades are desired, it is only necessary to remove one cam and to replace it by another having the proper contour. With the wire in place and the proper setting of the cutter 91, and with the cam having the desired contour incorporated in the machine, the latter is ready for operation save only for the proper pressure adjustment upon the upper feeding roller 32, an adjustment accomplished by manual tightening of the nut 46 until the wire is firmly clamped between the rollers.

In the operation of the machine, the lathe spindle 21 is driven by the lathe actuating mechanism at a normal speed of operation and carries with it in its rotation the cutting head 13 which includes, as described, the actual tooth forming means. The operation of the lathe also serves to effect the rotation of the shaft 63 which transmits its rotational force through the described gears and shafts to the lower roller 31 and to the cam 122. The wire advancing from the right, as viewed in Figures 1, 2, and 4, is forced by the rollers 31, 32, into the rotating bushing 82 and slides therethrough and on to the groove 88 in the anvil 86. The wire does not rotate but the anvil and the cutter 91 travel around it, the cutter 91 rotating upon its own axis 92 to form the spiral teeth extended above the normal surface of the wire as shown in Figure 5. The wire is preferably heat treated and hardened before passing through the machine and the action of the cutter 91 forms a raised sharpened cutting edge which extends spirally. Clearly the relationship of the speed of advancement of the wire, the speed of revolution of the cutter 91 about the wire, and the angle at which the cutter is set is determinative of the size, spacing and contour of the teeth. Increasing the speed of wire travel, other factors remaining fixed, would produce less teeth per unit of length. Changing the angularity of the cutter 91 has a similar effect and also varies somewhat the pitch of the teeth. A change in the speed of revolution of the cutting head likewise affects these factors.

The rotation of the feeding rollers is accompanied, as described, by the rotation of the cam 122 which, during the actual cutting operation, effects the holding of the collar 146 advanced as to force lever arm 107 to its inner position, the roller 111 at its end contacting the inner surface 116. After the predetermined length of saw blade has been cut however, the cam permits roller 126 to move inwardly toward its shaft 124, whereupon the holding pressure which has been exerted through the linkage comprising the rods 131, rockers 134 and bracket 141, is released and, under the urging of the spiral spring 121, the inner spindle-carried collar 113 slides to the left, as viewed in Fig. 4, that is toward headstock 16, whereupon roller 111 travels outwardly along sloping surface 118 and into abutting contact with surface 117. The pressure which has heretofore been exerted upon the cutter 91 is now released and the wire advances past the cutter making no more than frictional contact therewith. This continues for a period determined by the contour of the rotating cam 122 and provides an uncut length of wire adapted to be cut centrally to provide ends for each blade which can be shaped to form suitable seating means.

From time to time the rotary cutter 91 may require replacement but being made of extremely hard steel, this is necessary only infrequently. Similarly the guide 81 and the anvil 86 are made of extremely hard steel to resist abrasion of the traveling wire. Machine operation continues without supervision from the operator who needs only see that the feed of the wire continues uninterruptedly and whose only other duty is to energize and deenergize the actuating means.

Figure 11:
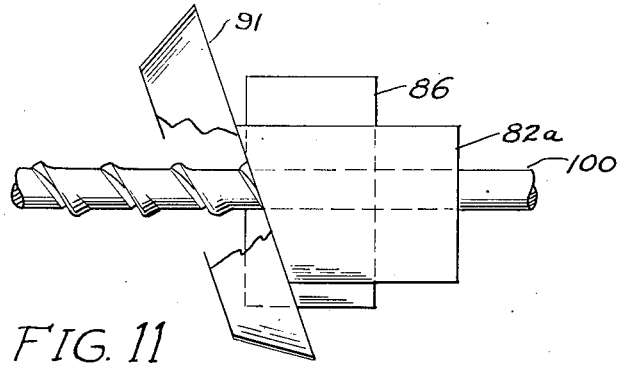

In the form of the invention illustrated in Figs. 10 and 11 the undercut or recessed portion 88a of bushing 82a consitutes a die to enable what amounts to a swaging effect in the forming of the spiral tooth. Thus, when cutter element 91 rotates about wire 100 and the wire is being forced thereagainst, the material which is cut from the wire is held back by the cutter to the extent that it fills the recessed or undercut portion of the guide bushing.

It may be noted that in the face of the guide bushing 82a, in this form of the invention, is in juxtaposition to the face of the cutting elements 91, and as illustrated in Fig. 12 is inclined to the same extent that the cutter is inclined with respect to the longitudinal axis of the wire. Accordingly, the material of the wire cut by the cutter means is retarded by such means and swaged or formed into the recess or undercut portion of the bushing as illustrated in Figs. 10 and 11 in lieu of against the end of the bushing which is spaced from the cutter according to the invention illustrated in Figs. 1–9.

While the particular apparatus herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

We claim:

1. A machine for making from a hard metal wire a spiral saw blade having a vertical cutting face and a sloping clearance face, comprising cutter means having a flat face arranged at an angle to said wire, means forcing said cutter means to penetrate said wire a predetermined amount, anvil means for supporting said wire in position to be penetrated by said cutter, means for guiding said wire to said cutter, said guide means being in juxtaposition to said flat face of said cutter and having a surface undercut inwardly and downwardly from said guide, means for rotating said cutter about said wire and for forcing said wire against said flat face to provide said vertical cutting face and for forcing said cut material against said undercut surface to provide said sloping surface.

2. A machine for making from a hard metal wire a spiral saw blade having a vertical cutting face and a sloping clearance face, comprising cutter means having a flat face arranged at an angle to said wire, means forcing said cutter means to penetrate said wire a predetermined amount, anvil means for supporting said wire in position to be penetrated by said cutter, guide means encompassing said wire and having a forming surface located with respect to said face of said cutter, means for rotating said cutter about said wire and for forcing said wire against said flat face to provide said vertical face and for forcing said material cut from said wire against said surface to provide said sloping face.

3. A machine for making from a hard metal wire a spiral saw blade having a vertical cutting face and a sloping clearance face, comprising cutter means having a flat face arranged at an angle to said wire, anvil means for supporting said wire in position to be penetrated by said cutter, guide means encompassing said wire, a forming surface located with respect to said face of said cutter, means forcing said cutter means to penetrate said wire a predetermined amount, means for rotating said cutter about said wire and for forcing said wire against said flat face to provide said vertical face and for forcing material cut from said wire against said surface to provide said sloping face.

References Cited in the file of this patent

UNITED STATES PATENTS

| Number | Name | Date |
|---|---|---|
| 206,688 | Richardson | Aug. 6, 1878 |
| 231,094 | Prosser | Aug. 10, 1880 |
| 321,478 | Benton | July 7, 1885 |
| 603,394 | Ashton | May 3, 1898 |
| 1,880,742 | Bosworth | Oct. 4, 1932 |
| 2,269,168 | Ure | Jan. 6, 1942 |